United States Patent [19]

Bahn

[11] Patent Number: 5,652,492

[45] Date of Patent: Jul. 29, 1997

[54] CURRENT SUPPLY CONTROL CIRCUIT FOR A RELUCTANCE MOTOR

[75] Inventor: Itsuki Bahn, Nerima-ku, Japan

[73] Assignee: Kabushikigaisha Sekogiken, Tokyo, Japan

[21] Appl. No.: 284,676

[22] PCT Filed: Nov. 3, 1993

[86] PCT No.: PCT/JP93/01609

§ 371 Date: Aug. 9, 1994

§ 102(e) Date: Aug. 9, 1994

[87] PCT Pub. No.: WO94/14235

PCT Pub. Date: Jun. 23, 1994

[30] Foreign Application Priority Data

Dec. 16, 1992 [JP] Japan ..................................... 4-361712

[51] Int. Cl.$^6$ ............................................................ H02P 3/12
[52] U.S. Cl. ............................................ 318/696; 318/254
[58] Field of Search ................................. 363/131–133, 363/136, 137, 16–17, 22, 24, 27, 31, 95, 97, 98; 318/696, 685, 254, 138, 439, 293, 701

[56] References Cited

U.S. PATENT DOCUMENTS

| | | | |
|---|---|---|---|
| 3,624,472 | 11/1971 | Graham | 318/809 |
| 4,024,444 | 5/1977 | Dewan et al. | 318/805 |
| 4,763,049 | 8/1988 | Magee | 318/254 |
| 4,774,443 | 9/1988 | Herzig | 318/293 |
| 5,334,919 | 8/1994 | Willard | 318/375 |

FOREIGN PATENT DOCUMENTS

| | | |
|---|---|---|
| 0 528 046 | 2/1993 | European Pat. Off. . |
| 62-135292 | 6/1987 | Japan . |
| 4-281390 | 10/1992 | Japan . |

*Primary Examiner*—Brian Sircus
*Attorney, Agent, or Firm*—Staas & Halsey

[57] ABSTRACT

A current supply control circuit for a reluctance motor supplies armature coils with current flowing in both forward and backward directions. The reluctance motor has a fixed armature having a magnetic pole wound repeatedly with armature coils of plural phases. The current is supplied to the armature coils in a reciprocative manner such that both ends of an armature coil of each phase are connected to positive and negative side switching elements through a plurality of diodes, connected in a forward direction.

1 Claim, 14 Drawing Sheets

(1) MAGNETIZATION ACCORDING TO ONE-WAY
    CURRENT SUPPLY TO 1ST-PHASE ARMATURE COIL (2) MAGNETIZATION ACCORDING TO ONE-WAY
    CURRENT SUPPLY TO 2ND-PHASE ARMATURE COIL (3) MAGNETIZATION ACCORDING TO ONE-WAY
    CURRENT SUPPLY TO 3RD-PHASE ARMATURE COIL (4) MAGNETIZATION ACCORDING TO OPPOSITE
    DIRECTIONAL CURRENT SUPPLY TO 1ST-PHASE
    ARMATURE COIL

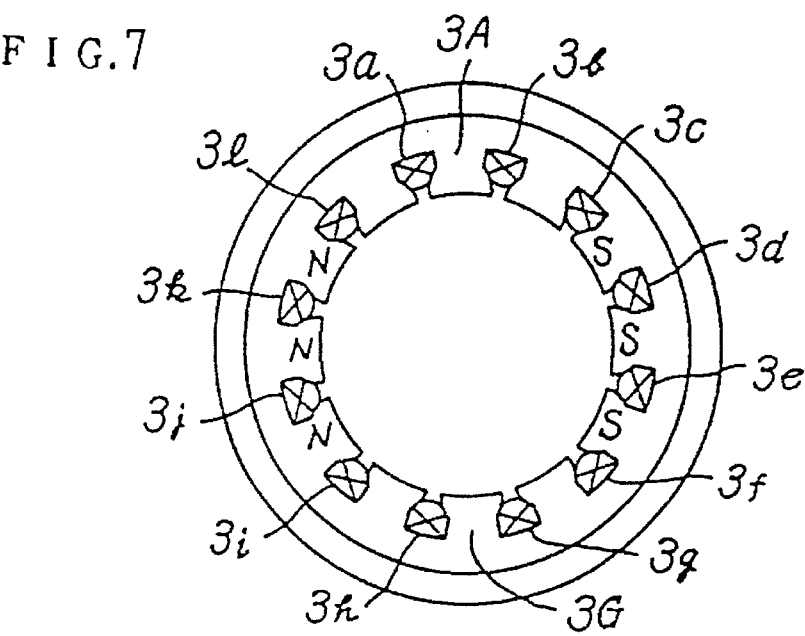
(5) MAGNETIZATION ACCORDING TO OPPOSITE DIRECTIONAL CURRENT SUPPLY TO 2ND-PHASE ARMATURE COIL
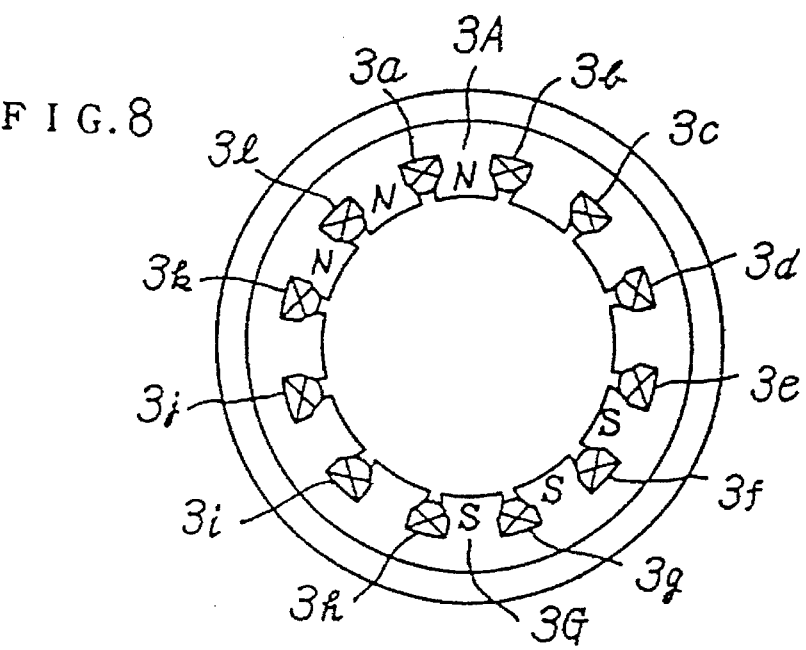
(6) MAGNETIZATION ACCORDING TO OPPOSITE DIRECTIONAL CURRENT SUPPLY TO 3RD-PHASE ARMATURE COIL

CURRENT SUPPLY CONTROL CIRCUIT FOR A RELUCTANCE MOTOR

TECHNICAL FIELD

The present invention relates to a current supply control circuit for a reluctance motor designed to supply the armature coils with armature current flowing in both forward and backward directions.

BACKGROUND ART

A reluctance motor with a fixed armature having a magnetic pole wound repeatedly with armature coils of plural phases will be explained hereinafter with respect to current supply to the armature coils. In the following explanation, angles without any special comments are electric angles.

Furthermore, in the following description, the terms "one direction" may be replaced with the terms "forward direction" or "going direction", while the term "the other direction" may be replaced with the term "reverse direction" or "returning direction".

FIG. 1 is a cross-sectional view showing a fixed armature and a rotor. Rotors 1, each formed by laminating electromagnetic steel sheets, are equipped with salient poles 1a, 1b, each having a width of 180 degrees (=90 degrees in terms of mechanical angle), and are mutually spaced with a phase difference of 360 degrees. A rotational shaft 2 is provided at a center of the rotor 1. The arrow A indicates a rotational direction of the rotor 1.

A fixed armature 3, similarly formed by laminating electromagnetic steel sheets, has an inside surface provided with twelve uniformly spaced slots 3a, 3b, 3c, - - -, and is fixed to a frame member 4.

The slots 3a, 3d are respectively wound with one coil, while the slots 3g, 3j are respectively wound with another coil. To constitute a 1st-phase armature coil, these two coils are connected with each other in series or in parallel, although they are connected in series in this embodiment.

The slots 3b, 3e be are wound with one coil, while the slots 3h, 3k are wound with another coil. These two coils are connected with each other in series, thus constituting a 2nd-phase armature coil.

The slots 3c, 3f are wound with one coil, while the slots 3i, 3l are wound with another coil. These two coils are connected with each other in series, thus constituting a 3rd-phase armature coil.

FIG. 2 is an embodiment showing the rotor 1, a rotational plate 15 detecting the position of rotor 1, and armature coils.

In FIG. 2, armature coils 5a and 5d represent the previously-described 1st-phase armature coil. Armature coils 5b and 5e represent the previously-described 2nd-phase armature coil. Armature coils 5c and 5f represent the previously-described 3rd-phase armature coil. Lead terminals of 1st-, 2nd- and 3rd-phase armature coils are denoted by reference numerals 6a, 6b and 6c, 6d and 6e, 6f, respectively.

The above-described 1st-, 2nd- and 3rd-phase armature coils 5a, 5d and 5b, 5e and 5c, 5f are referred to as armature coils 7a, 7b and 7c, respectively, hereinafter.

Next, an explanation will be made as to the case where the above-described armature coils 7a, 7b and 7c are respectively supplied with electric current through a well-known current supply control circuit which has switching elements at the side of the positive pole as well as at the side of the negative pole of the armature coil, and designed to supply the current flowing in one direction, from the side of the positive pole to the side of negative pole of the armature coil.

In FIGS. 1 and 2, when the armature coil 7b is activated, the salient poles 1a and 1b are magnetically attracted, causing the rotor 1 to rotate in a direction of the arrow A. When the rotor 1 rotates 90 degrees, the armature coil 7b is deactivated, and the armature coil 7c is activated. When the rotor 1 further rotates 120 degrees, the armature coil 7c is deactivated, and the armature coil 7a is activated. A current supply mode is cyclically alternated in every 120-degree rotation in order of armature coil 7a→armature coil 7b→armature coil 7c. That is, the armature coils are supplied with electric current in order of 1st-phase→2rd-phase→3rd phase. Repetition of such a current supply mode enables a motor to be driven as a three-phase half-wave motor.

As indicated by the current supply curves 8a, 8b and 8c of the respective armature coils shown in FIG. 17, the supply of current starts at 0 degrees of overlapping between the salient pole of the rotor and the magnetic pole of the armature, and the current in the armature coil decreases rapidly when the supply of current is discontinued at 120 degrees of overlapping, but the current caused by the inductance flows as indicated by curves 9a, 9b and 9c even where exceeding 120 degrees of overlapping.

According to the one-way current supply to the armature coils of FIGS. 1 and 2, magnetization of N- and S-poles due to current supply to respective armature coils is repeated in the order of FIG. 3→FIG. 4→FIG. 5→FIG. 3→FIG. 4→FIG. 5, - - - . However, when the magnetization of FIG. 5 is changed to that of FIG. 3, that is, when the current supply of the 3rd phase is changed to that of the 1st phase, for the magnetic pole 3A where the 3rd phase armature coil 7c wound in slots 3e, 3h and 3k, 3b and the 1st phase armature coil 7a wound in slots 3a, 3d and 3g, 3j are wound together, in FIG. 1, the N-pole magnetization of FIG. 3 according to current curve 8a of the 1st phase current supply occurs simultaneously with S-pole magnetization of FIG. 5 according to current curve 9c of the inductance at the time of the 3rd phase current supply discontinuation. Further, for the magnetic pole 3G, S-pole magnetization of FIG. 3 according to current curve 8a of the 1st phase current supply occurs simultaneously with N-pole magnetization of FIG. 5 according to current curve 9c of the inductance at the time of the 3rd phase current supply discontinuation. Such current supply to an armature coil may cause drawbacks such as reduction of the rotational torque, drop of output and operation efficiency and occurrence of vibration and noise.

For this reason, the magnetization system is arranged so that the magnetization of N- and S-poles by current supplied to respective armature coils takes place in the order of FIG. 3→FIG. 4→FIG. 5→FIG. 6→FIG. 7→FIG. 8, so as to cause a rotational magnetization.

To realize the magnetization in the cases illustrated in FIGS. 3, 4 and 5 and the magnetization in the cases illustrated in FIGS. 6, 7 and 8, direction of current supplied to the armature coils needs to be changed in a reciprocative manner.

According to one conventional current supply control circuit for changing direction of current to be supplied to armature coils in a reciprocative manner, one end and the other end of each armature coil are connected with each other to constitute a circular connection, and there are provided switching elements at positive and negative terminal sides of a power source in the above connecting points to constitute a bridge circuit respectively.

This circuit can change the direction of current flowing through the armature coil of one phase from a going direction to a returning direction, i.e. from one direction to the other direction, and vice versa; however, this circuit is not applicable to reluctance motors because the current also flows through another armature coil of the other phase simultaneously to cause counter torque.

In the reluctance motors, a current supply to an armature coil of each phase needs to be made in a limited period divided according to the number of phases. To accomplish this end, one well known current supply control circuit comprises a bridge circuit formed by providing switching elements at the positive terminal side and negative terminal side of a power source in one end and the other end of each armature coil.

This circuit is designed to activate respective phase armature coils 7a, 7b and 7c to cause the rotational magnetization of N- and S-poles to occur in the order of FIG. 3→FIG. 4→FIG. 5→FIG. 6→FIG. 7→FIG. 8, but the following disadvantages are involved.

The conventional current supply control of the reluctance motor is required to comprise at least four times as many expensive switching elements for reciprocating activation of the armature coils as the number of the phase, and this entails the disadvantages such as complex composition, high cost, large dimensions and weight of the circuit.

Thus, an object of the present invention is to provide a current supply control circuit for reluctance motors which contributes to improving the efficiency of reluctance motors, as well as to suppressing noise and vibration, and to the reduction of price, size and weight of the circuit.

SUMMARY OF INVENTION

The present invention provides a current supply control circuit for a reluctance motor having n-phase armature coils, where n is a positive integer not less than 3, comprising:

- a first positive side switching element having one end connected to a positive terminal of the direct current electric power source and the other end connected to one end of the first phase armature coil and to the other end of the n-th phase armature coil via diodes connected in a forward direction respectively,
- a (n−p+1)-th positive side switching element having one end connected to a positive terminal of the direct current electric power source and the other end connected to the other end of the (n−p)-th phase armature coil and to one end of the (n−p+1)-th phase armature coil via diodes connected in a forward direction respectively, where p is a positive integer less than side n,
- a first negative side switching element having one end connected to a negative terminal of the direct current electric power source and the other end connected to one end of the first phase armature coil and to the other end of the n-th phase armature coil via diodes connected in a forward direction respectively, and,
- a (n−p+1)-th negative side switching element having one end connected to a negative terminal of the direct current electric power source and to the other end connected to the other end of the (n−p)-th phase armature coil and to one end of the (n−p+1)-th phase armature coil via diodes connected in a forward direction respectively.

According to the current supply control circuit for a reluctance motor in accordance with the present invention, the number of switching elements required for supplying armature coils with current in reciprocative manner is two times as many as the number of phases. Accordingly, the total number of switching elements can be reduced to a half of that of the conventional one, and, therefore, the circuit can be simplified and price can be reduced largely. Furthermore, size and weight can also be reduced, which are the remarkable effects of the present invention.

BRIEF DESCRIPTION OF DRAWINGS

FIG. 7 is a diagram (5) illustrating magnetization of armature coils;

FIG. 8 is a diagram (6) illustrating magnetization of armature coils;

BEST MODE FOR CARRYING OUT THE INVENTION

Figure 1:
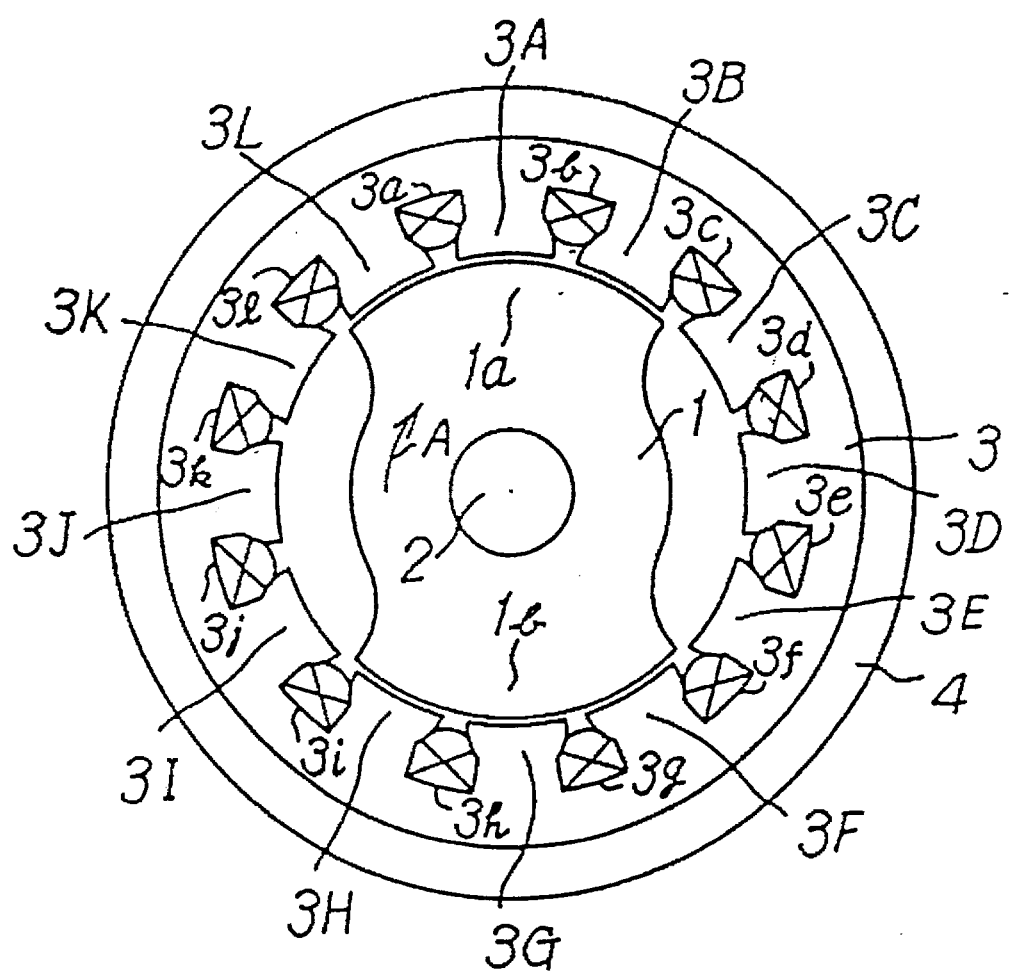
FIG. 1 is a transversal cross-sectional view showing one embodiment of a reluctance motor embodying the present invention.
Figure 2:
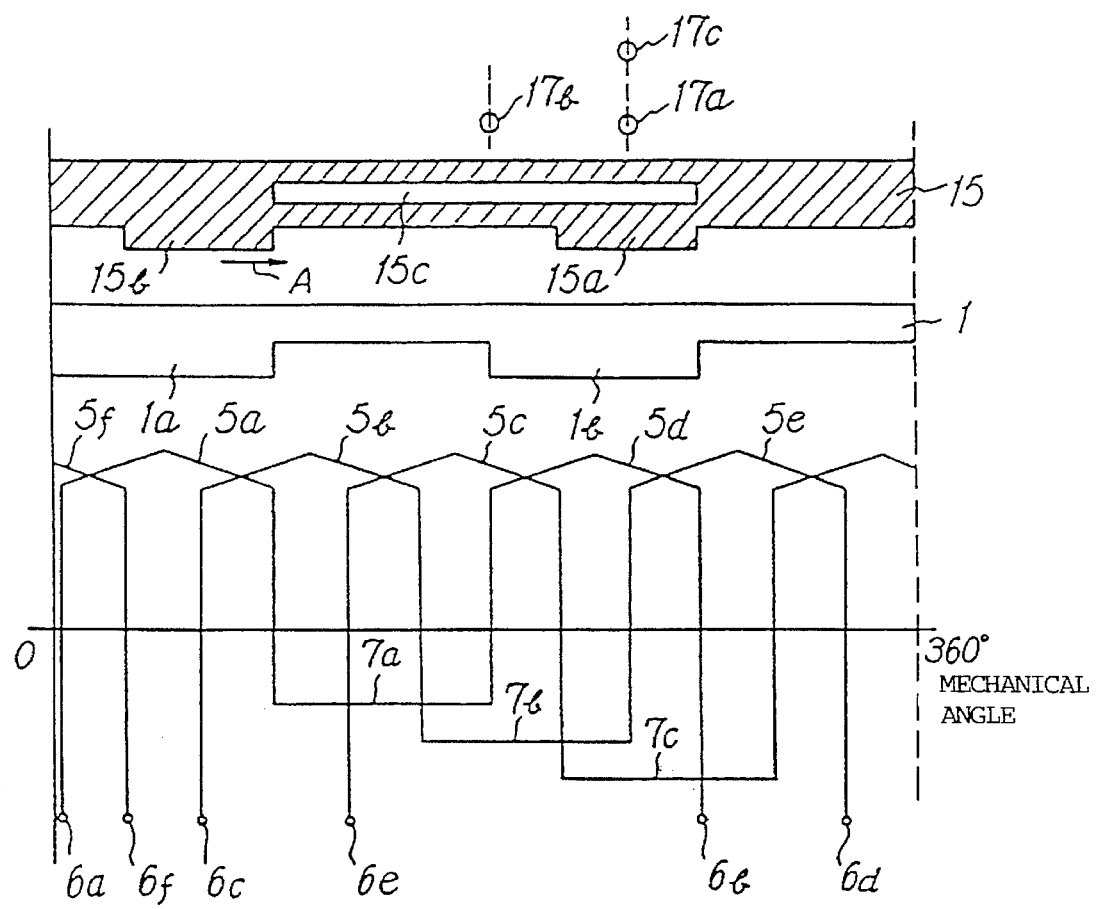
FIG. 2 is a development showing a fixed armature, a rotor and a position detecting rotational plate respectively provided in the motor shown in FIG. 1.
Figure 9:
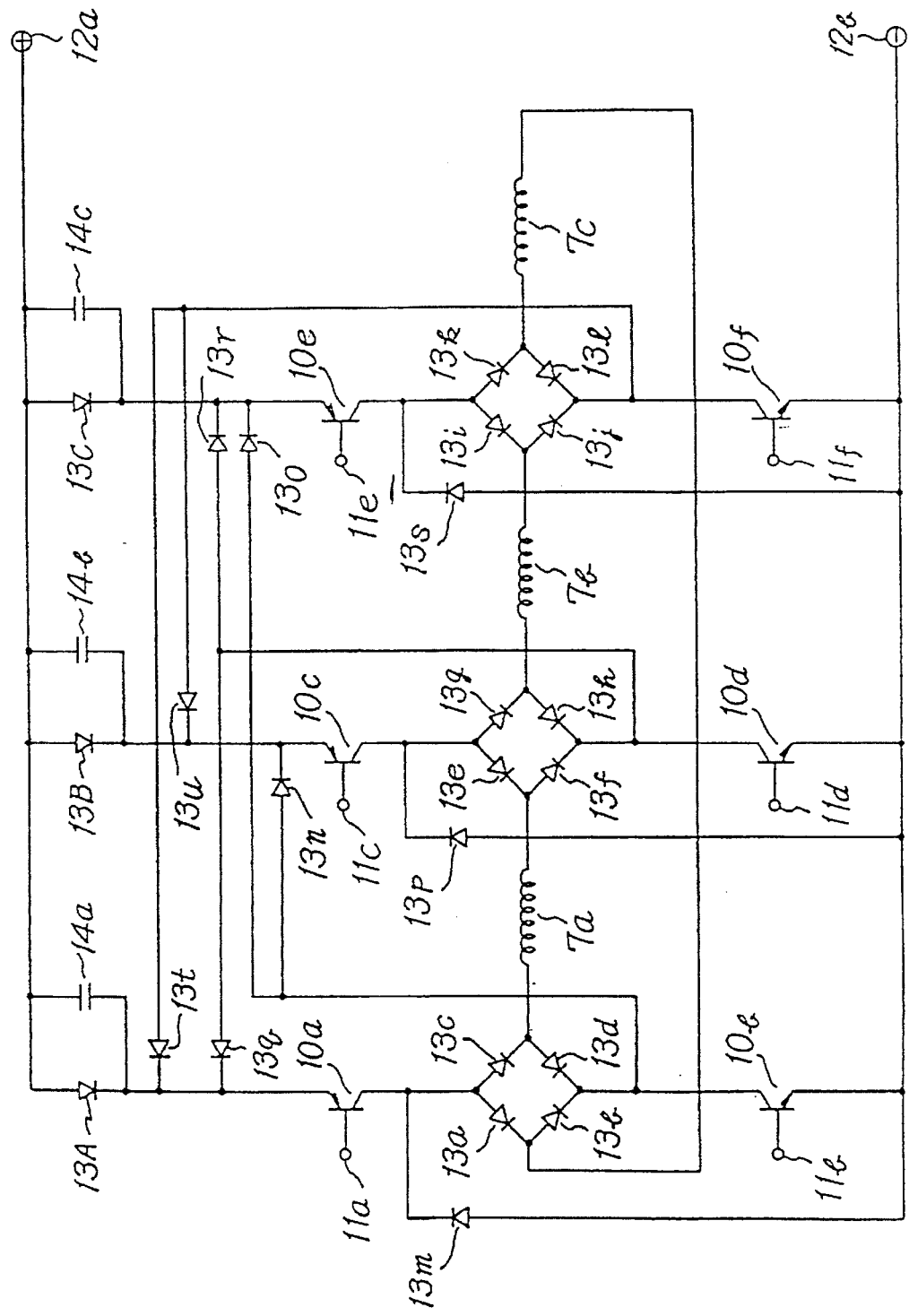
FIG. 9 is a diagram showing a current supply control circuit in accordance with one embodiment of the present invention.

FIG. 9 shows the current supply control circuit of a reluctance motor in accordance with one embodiment of the present invention, which is used to drive a three-phase reluctance motor comprising armature coils of plural phases, which are wound around one magnetic pole of the fixed armature shown in FIGS. 1 and 2.

Referring to FIG. 9, first, second and third positive side switching elements 10a, 10c and 10e are connected in parallel to the positive terminal 12a of a DC power source, and first, second and third negative side switching elements 10b, 10d and 10f are connected in parallel to negative terminal 12b of a DC power source.

One end of the first-phase armature coil 7a is connected to the first positive side switching element 10a via a diode 13c connected in a forward direction, and to the first negative side switching element 10b via a diode 13d connected in a forward direction.

The other end of the first-phase armature coil 7a is connected to the second positive side switching element 10c via a diode 13e connected in a forward direction, and to the second negative side switching element 10d via a diode 13f connected in a forward direction.

One end of the second-phase armature coil 7b is connected to the second positive side switching element 10c via a diode 13g connected in a forward direction, and to the second negative side switching element 10d via a diode 13h connected in a forward direction.

The other end of the second-phase armature coil 7b is connected to the third positive side switching element 10e via a diode 13i connected in a forward direction, and to the third negative side switching element 10f via a diode 13j connected in a forward direction.

One end of the third-phase armature coil 7c is connected to the third positive side switching element 10e via a diode 13k connected in a forward direction, and to the third negative side switching element 10f via a diode 13l connected in a forward direction.

The other end of the third-phase armature coil 7c is connected to the first positive side switching element 10a via a diode 13a connected in a forward direction, and to the first negative side switching element 10b via a diode 13b connected in a forward direction.

In such a current supply control circuit of FIG. 9 applied to reluctance motors, a connecting point of the first negative side switching element 10b and the diodes 13b, 13d is connected to positive terminals of the second and third positive side switching elements 10c, 10e via diodes 13n, 13o connected in the opposite direction, respectively. A connecting point of the second negative side switching element 10d and the diodes 13f, 13h connected in a forward direction is connected to positive terminals of the first and third positive side switching elements 10a, 10e via diodes 13q, 13r connected in the opposite direction, respectively.

A connecting point of the third negative side switching element 10f and the diodes 13j, 13l connected in a forward direction is connected to positive terminals of the first and second positive side switching elements 10a, 10c via diodes 13t, 13u connected in the opposite direction, respectively. Connecting points of the first, second and third positive side switching elements 10a, 10c and 10e and the diodes 13a, 13c, 13e, 13q and 13i, 13k connected in a forward direction are connected to the negative terminal of direct-current electric power source via diodes 13m, 13p and 13s connected in the opposite direction.

Connecting points of the positive side switching elements 10a, 10c and 10e and the diodes 13n, 13o, 13q, 13r and 13t, 13u connected in the opposite direction are connected to the positive terminal 12a of direct-current electric power source via capacitors 14a, 14b and 14c each connected in parallel with diodes 13A, 13B and 13C connected in the forward direction, respectively.

A means for controlling input signals to the switching elements of the current supply control circuit of a reluctance motor shown in FIG. 9 and its current supply function will be next explained.

Figure 12:
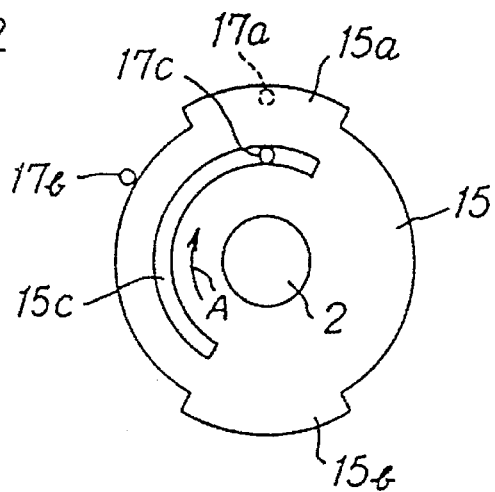
FIG. 12 is a plan view showing the position detecting rotational plate and coils of position detecting elements.

FIG. 12 shows a rotational plate 15 for indicating the position of the salient poles 1a and 1b of rotor 1. This rotational plate 15 is supported on the rotational shaft 2 and disposed close to the rotor 1.

The rotational plate 15, made of a metallic conductor such as aluminum, has an outer periphery formed with protrusions 15a and 15b corresponding in number to the salient poles of the rotor 1 and an inner semicircular elongated hole 15c.

The protrusions 15a and 15b, respectively having a width of 120 degrees, are spaced 240 degrees from each other. The elongated hole 15c, with a width of 360 degrees, has an overlapped phase relationship with the protrusion 15a and the space.

Small-diameter flat coils 17a, 17b and 17c, respectively serving as a position detecting element, are mounted on a supporting member (not shown) fixed to the frame member 4 of FIG. 1. The coils 17a, 17b and 17c have coil surfaces confronting the protrusions 15a, 15b and the elongated hole 15c through a void.

A development of rotational plate 15 and coils 17a, 17b, 17c is shown in FIG. 2. The arrow A indicates a rotational direction, the same as that shown in FIG. 1. The coil 17a is spaced 120 degrees from the coil 17b, and the coil 17c is disposed in phase with the coil 17a.

Figure 13:
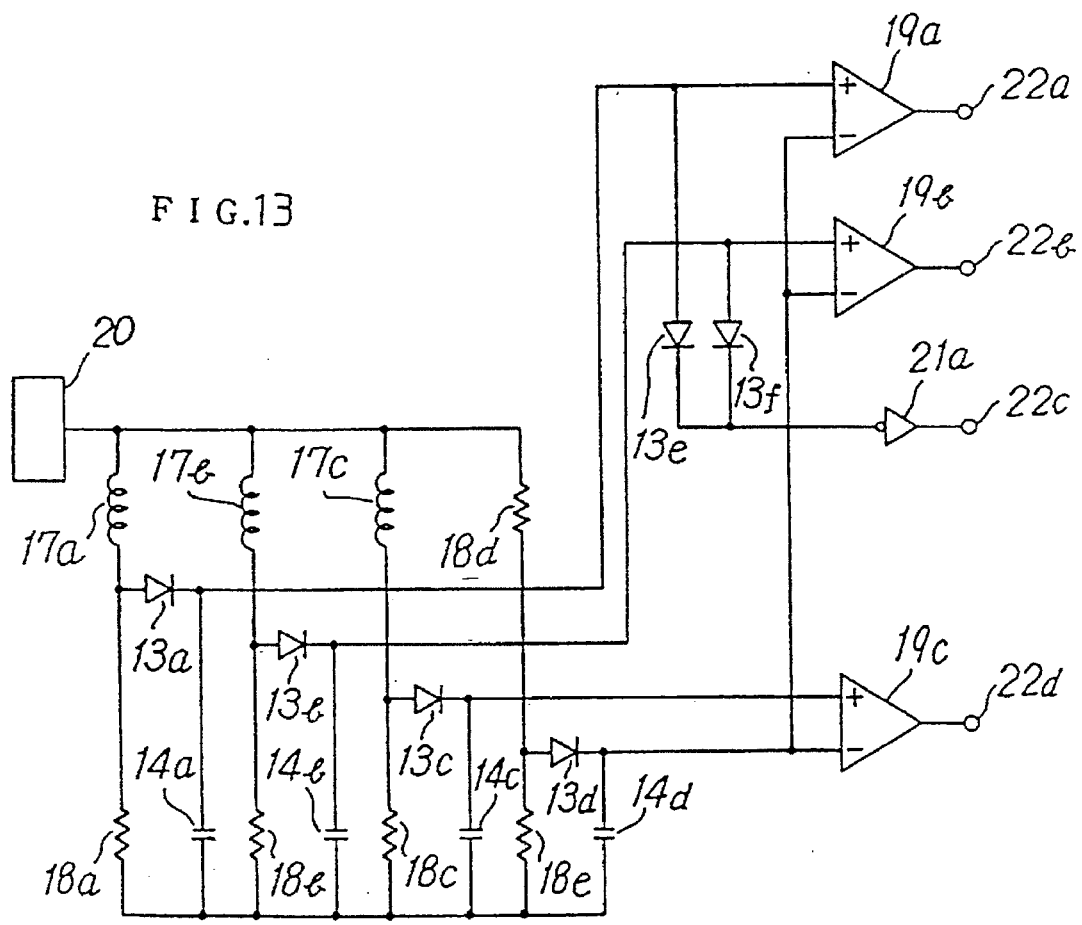
FIG. 13 is a diagram showing an electric circuit for obtaining position detecting signals from the coils.

A means for obtaining position detecting signals from coils 17a, 17b and 17c will be explained below. FIG. 13 shows a circuit for obtaining position detecting signals from the coils 17a, 17b and 17c.

In FIG. 13, coils 17a, 17b, 17c and resistors 18a, 18b, 18c, 18d, 18e constitute a bridge circuit, which is designed to be in a balanced condition when the coils 17a and 17b do not confront the protrusions 15a and 15b, as well as when the coil 17c does not confront the rotational plate 15 (when the coil 17c confronts the elongated hole 15c). Accordingly, the outputs of a low-pass filter consisting of the diode 13a and the capacitor 14a are equal, and the level of the output of an operational amplifier 19a becomes low.

A numeral 20 denotes an oscillator causing oscillation of approximately 1 Megacycle. When the coil 17a confronts the protrusions 15a, 15b, the impedance decreases due to eddy current loss so that potential drop of the resistor 18a becomes larger, and therefore a HIGH-level output can be obtained from the terminal 22a due to an input to the plus terminal of the operational amplifier 19a.

When the coil 17b confronts the protrusions 15a, 15b, potential drop of the resistor 18b becomes larger and therefore a HIGH-level output can be obtained from the terminal 22b due to an input to the plus terminal of the operational amplifier 19b.

When the coil 17c confronts the rotational plate 15, potential drop of the resistor 18c becomes larger, and therefore a HIGH-level output can be obtained from the terminal 22d due to an input to the plus terminal of the operational amplifier 19c through the low-pass filters 13c, 14c.

Figure 10:
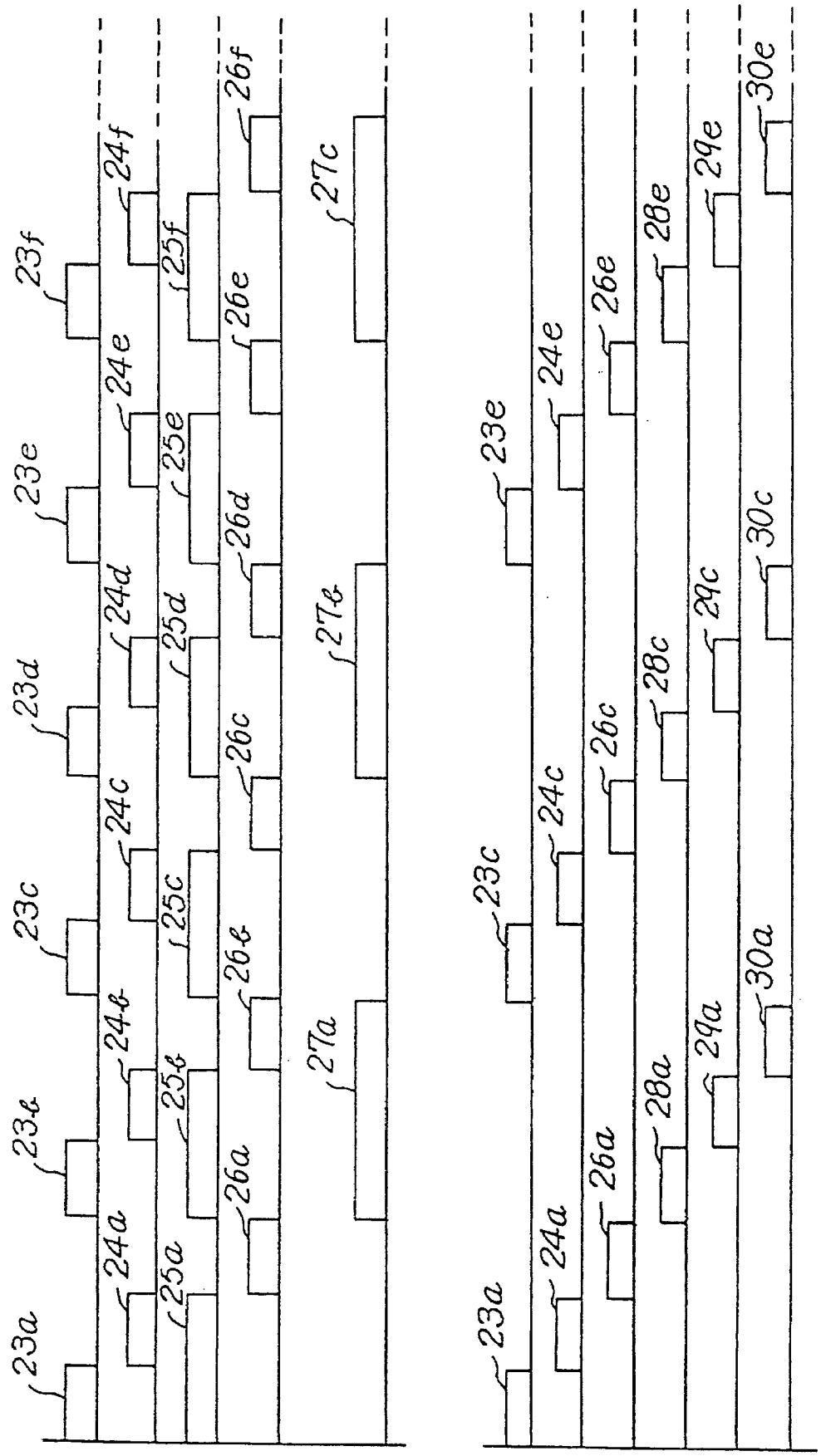
FIG. 10 is a time chart showing position detecting signals.

Output signals from the operational amplifiers 19a and 19b become position detecting signals, as shown by curves 23a, 23b - - - , curves 24a, 24b - - - in the time chart of FIG. 10, and are outputted from the terminals 22a and 22b.

These two sets of position detecting signals, represented by curves 23a, 23b, - - - and curves 24a, 24b, - - - , respectively, have a width of 120 degrees, and respectively spaced 240 degrees from one another with a mutual phase difference of 120 degrees. The curve 23a is adjacent to the curve 24a on time axis.

A signal inputted to an inversion circuit 21a through two diodes is represented by curves 25a, 25b, - - -; therefore, an output signal from the inversion circuit 21a is represented by curves 26a, 26b, - - -, and is outputted from the terminal 22c. The curves 26a, 26b, - - - respectively have a time interval of 120 degrees.

An output signal of the operational amplifier 19c is represented by curves 27a, 27b, - - - and is outputted from the terminal 22d. The curves 27a, 27b, - - - -, respectively having a width of 360 degrees, are spaced 360 degrees from one another.

Figure 14:
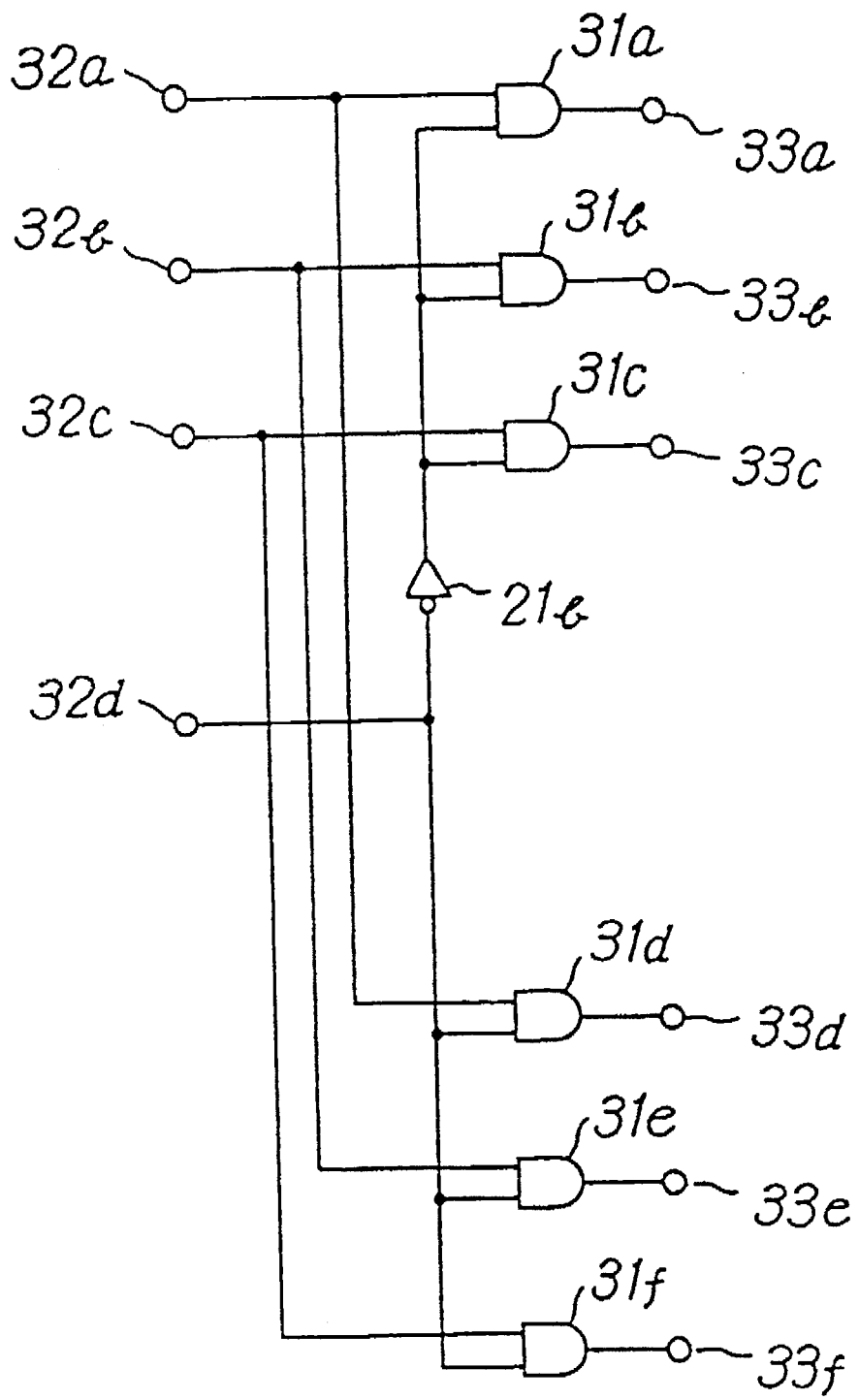
FIG. 14 is a diagram showing an electric circuit for converting the position detecting signals.

As the curves 27a, 27b, - - - overlap with respect to phase with curves 23b, 24b, 26b, curves 23d, 24d, 26d, and curves 23f, 24f, 26f, signals from the terminals 22a, 22b, 22c and 22d of FIG. 13 are inputted to the terminals 32a, 32b, 32c and 32d of the circuit which utilizes AND circuits and an inversion circuit of FIG. 14.

The lower part of FIG. 10 shows outputs of the terminals 33a, 33b, 33c, 33d, 33e and 33f as curves 23a, 23c, 23e - - -, curves 24a, 24c, 24e, - - -, curves 26a, 26b, 26e, - - - which are identical with the curves shown in the upper part of FIG. 10, and also curves 28a, 28c, 28e, - - -, curves 29a, 29c, 29e, - - - curves 30a, 30c, 30e. These six sets of position detecting signals, each comprising 120-degree width curves and being spaced 600 degrees are successively delayed by a 120-degree phase difference, so that they are continuous on the time axis.

When the operational amplifier 19c generates no output, only the AND circuits 31a, 31b and 31c generate outputs from their terminals 33a, 33b and 33c. When the operational amplifier 19c generates an output, only the AND circuits 31d, 31e and 31f generate outputs from their terminals 33d, 33e and 33f.

Figure 15:
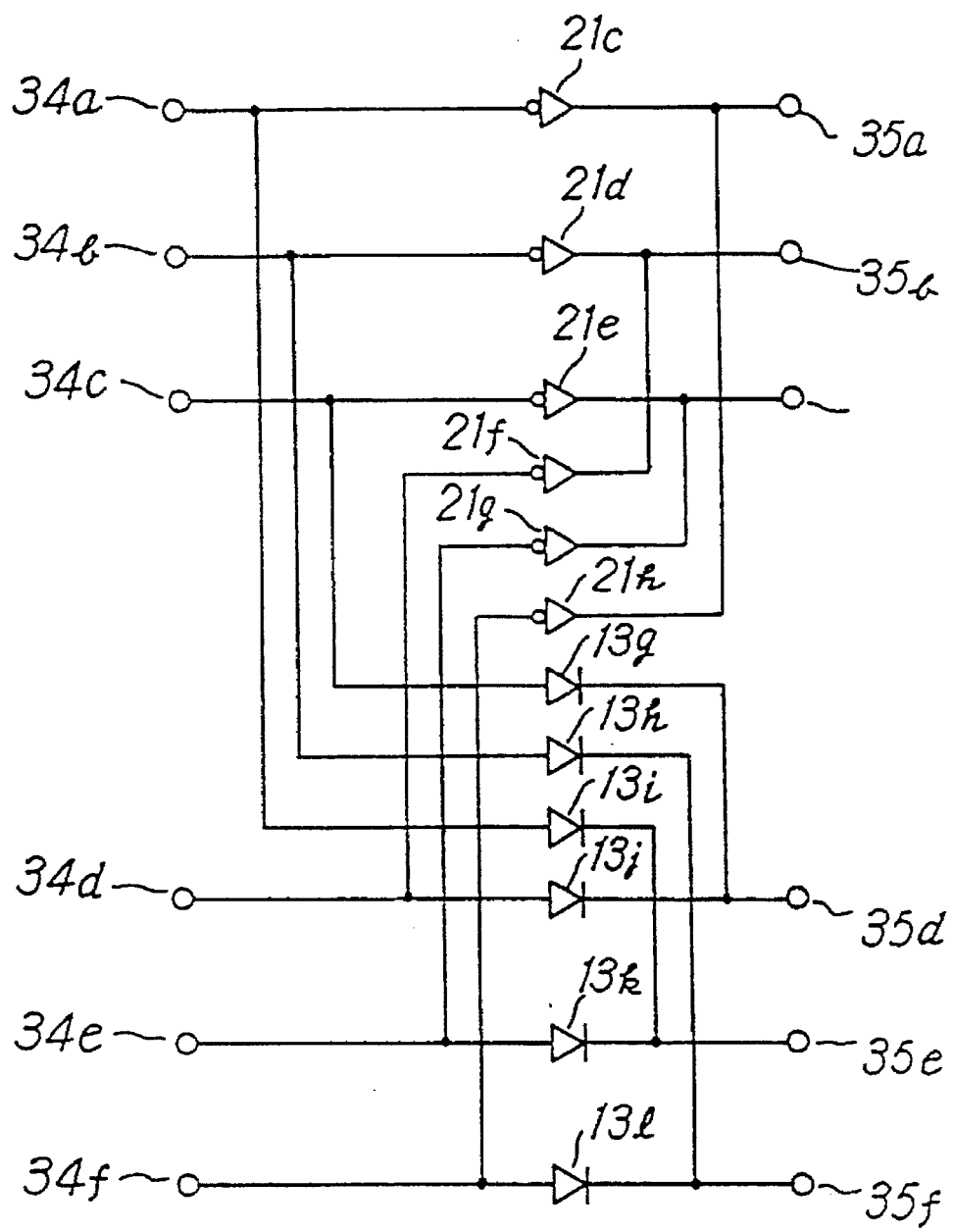
FIG. 15 is a diagram showing an electric circuit for distributing the converted position detecting signals to respective switching elements.

FIG. 15 shows a circuit utilizing inversion circuits and diodes for driving switching elements in response to the above-described position detecting signals.

Figure 11:
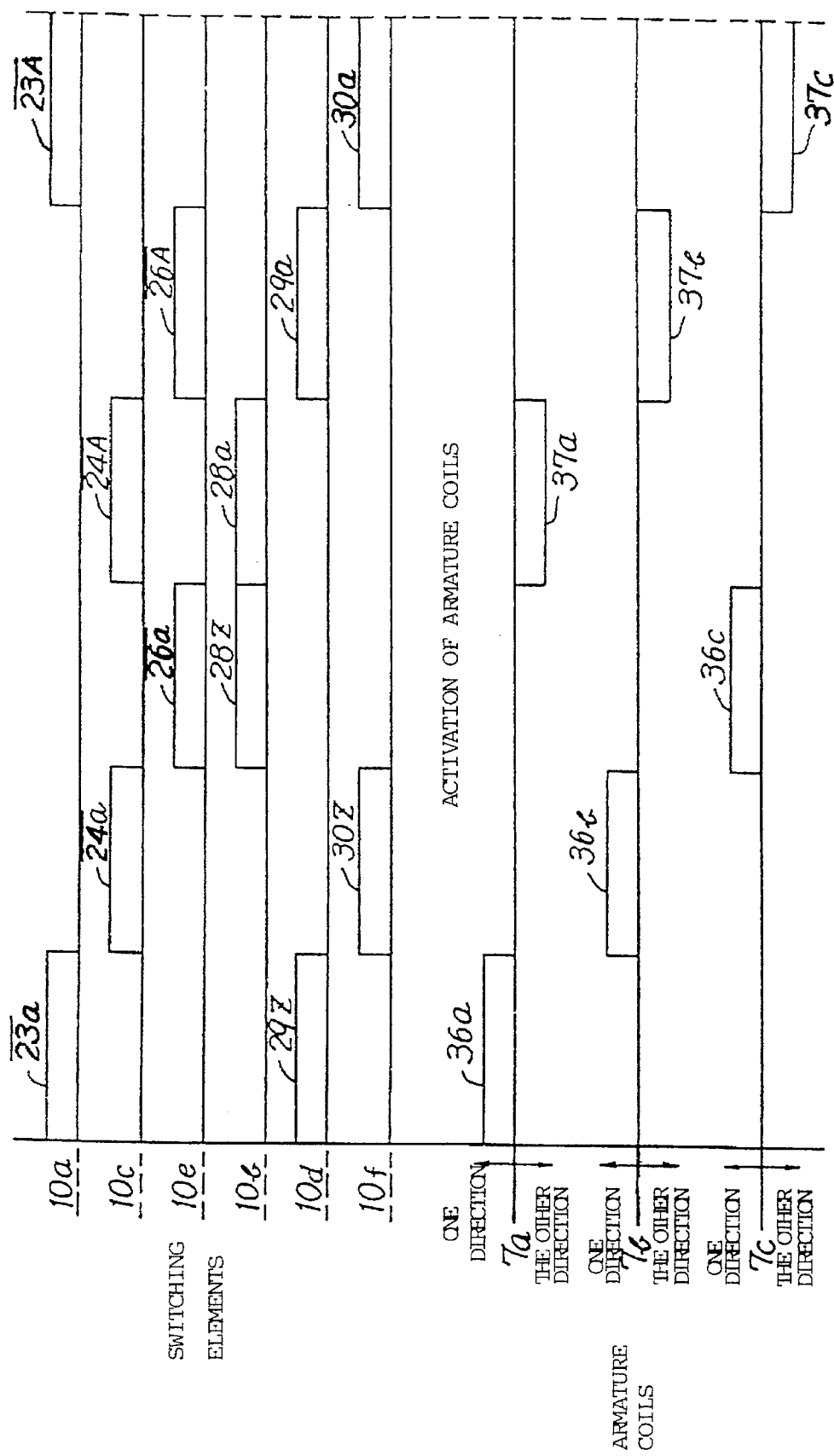
FIG. 11 is a time chart showing activation of switching elements and armature coils.

Output signals of the terminals 33a, 33b and 33c are inputted to the terminals 34a, 34b and 34c of FIG. 15, respectively. Similarly, output signals of the terminals 33d, 33e and 33f are inputted to the terminals 34d, 34c and 34f, respectively. FIG. 11 shows the time chart of current supply signal inputs to respective switching elements, which are outputted from the circuit of FIG. 15 by inputting the position detecting signals 23a, 24a, 26a, 28a, 29a and 30a shown in the lower part of FIG. 10 to the same.

When the position detecting signal 23a is inputted through the terminal 34a to the inversion circuit 21c, a negative signal 23a is outputted from the terminal 35a and then supplied to the terminal 11a of FIG. 9 to turn on the switching element 10a. Meanwhile, a positive signal 29z passing through the diode 13i is outputted from the terminal 35e, and then supplied to the terminal 11d of FIG. 9 to turn on the switching element 10d, thereby supplying the armature coil 7a with current flowing in one direction from left to right in the drawing.

Figure 16:
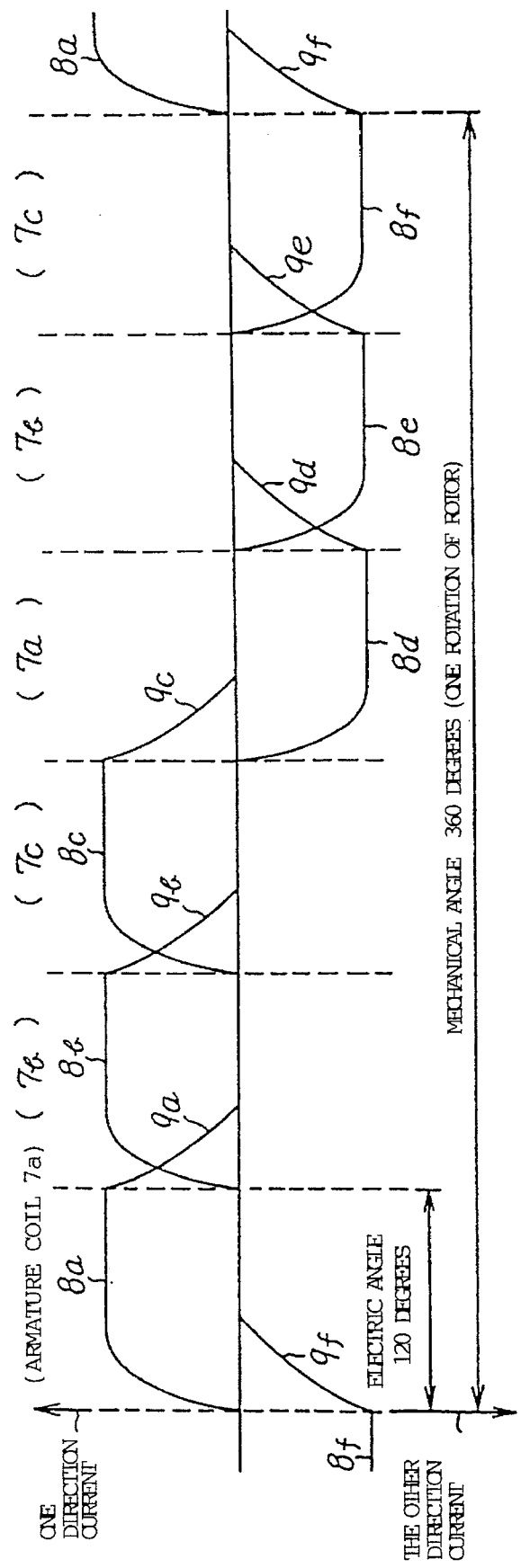
FIG. 16 is a time chart showing current supply curves of respective armature coils in accordance with the reciprocative current supply control circuit.

This current is represented by the curve 8a in FIG. 16. In this case, the diodes 13e, 13h, 13i and 13k prevent current from flowing through other armature coils 7b and 7c.

When the position detecting signal 24a is inputted through the terminal 34b to the inversion circuit 21d, a negative signal 24a is outputted from the terminal 35b and then supplied to the terminal 11c of FIG. 9 to turn on the switching element 10c. Meanwhile, a positive signal 30z passing through the diode 13h is outputted from the terminal 35f and then supplied to the terminal 11f of FIG. 9 to turn on the switching element 10f, thereby supplying the armature coil 7b with current flowing in one direction from left to right in the drawing. This current is represented by the curve 8b in FIG. 16. In this case, the diodes 13i, 13l, 13b, and 13c prevent current from flowing through other armature coils 7a and 7c.

When the position detecting signal 26a is inputted through the terminal 34c to the inversion circuit 21e, a negative signal 26a is outputted from the terminal 35c and then supplied to the terminal 11e of FIG. 9 to turn on the switching element 10e. Meanwhile, a positive signal 28z passing through the diode 13g is outputted from the terminal 35d and then supplied to the terminal 11b of FIG. 9 to turn on the switching element 10b, thereby supplying the armature coil 7c with current flowing in one direction from left to right in the drawing.

This current is represented by the curve 8c in FIG. 16. In this case, the diodes 13a, 13d, 13f and 13g prevent current from flowing through other armature coils 7a and 7b.

When the position detecting signal 28a is inputted through the terminal 34d to the inversion circuit 21f, a negative signal 24a is outputted from the terminal 35b and then supplied to the terminal 11c of FIG. 9 to turn on the switching element 10c. Meanwhile, a positive signal 28a passing through the diode 13j is outputted from the terminal 35d and then supplied to the terminal 11b of FIG. 9 to turn on the switching element 10b, thereby supplying the armature coil 7a with current flowing in the other direction from right to left in the diagram. This current is represented by the curve 8d in FIG. 16. In this case, the diodes 13i, 13l, 13b, and 13c prevent current from flowing through other armature coils 7b and 7c.

When the position detecting signal 29a is inputted through the terminal 34e to the inversion circuit 21g, a negative signal 26A is outputted from the terminal 35c and then supplied to the terminal 11e of FIG. 9 to turn on the switching element 10e. Meanwhile, a positive signal 29a passing through the diode 13k is outputted from the terminal 35e and then supplied to the terminal 11d of FIG. 9 to turn on the switching element 10d, thereby supplying the armature coil 7b with current flowing in the other direction from right to left in the drawing.

This current is represented by the curve 8e in FIG. 16. In this case, the diodes 13a, 13d, 13f, and 13g prevent current from flowing through other armature coils 7a and 7c.

When the position detecting signal 30a is inputted through the terminal 34f to the inversion circuit 21h, a negative signal 23A is outputted from the terminal 35a and then supplied to the terminal 11a of FIG. 9 to turn on the switching element 10a. Meanwhile, a positive signal 30a passing through the diode 13l is outputted from the terminal 35f and then supplied to the terminal 11f of FIG. 9 to turn on the switching element 10f, thereby supplying the armature coil 7c with current flowing in the other direction from right to left in the drawing.

This current is represented by the curve 8f in FIG. 16. In this case, the diodes 13e, 13h, 13j, and 13k prevent current from flowing through other armature coils 7a and 7b.

Figure 17:
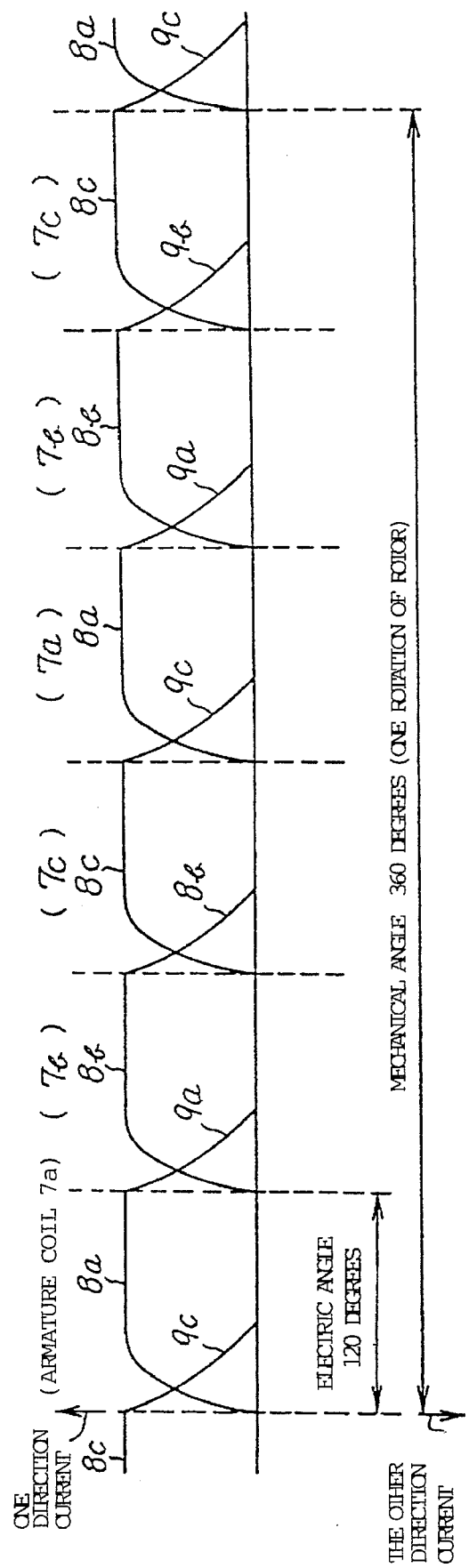
FIG. 17 is a time chart showing current supply curves of the armature coils by a one-way current supply control circuit.

The current supply control circuit of FIG. 9 provides respective armature coils with current represented by curves 8a, 8b and 8c shown in FIG. 16, wherein current supplying starts at zero degrees of overlapping between a rotor salient pole and an armature magnetic pole and then discontinues at 120 degrees, current decreasing rapidly but continuing to flow even after passing through 120 degree due to inductance as curves 9a, 9b and 9c. These current curves are similar to those of FIG. 17, but are different in that first-, second- and third-phase currents flow in one direction during the first half rotation of the rotor 1 and in the other direction during the second half rotation of the rotor 1.

Figure 3:
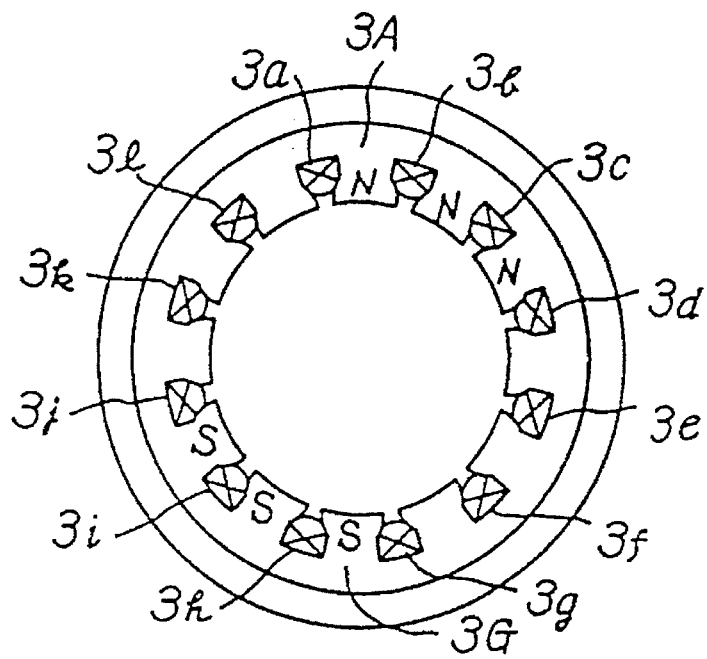
FIG. 3 is a diagram (1) illustrating magnetization of armature coils.
Figure 4:
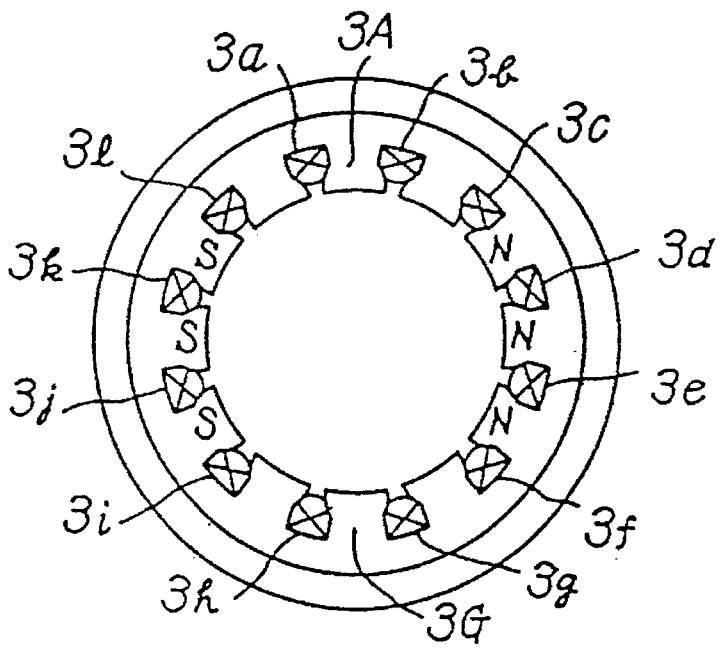
FIG. 4 is a diagram (2) illustrating magnetization of armature coils.
Figure 5:
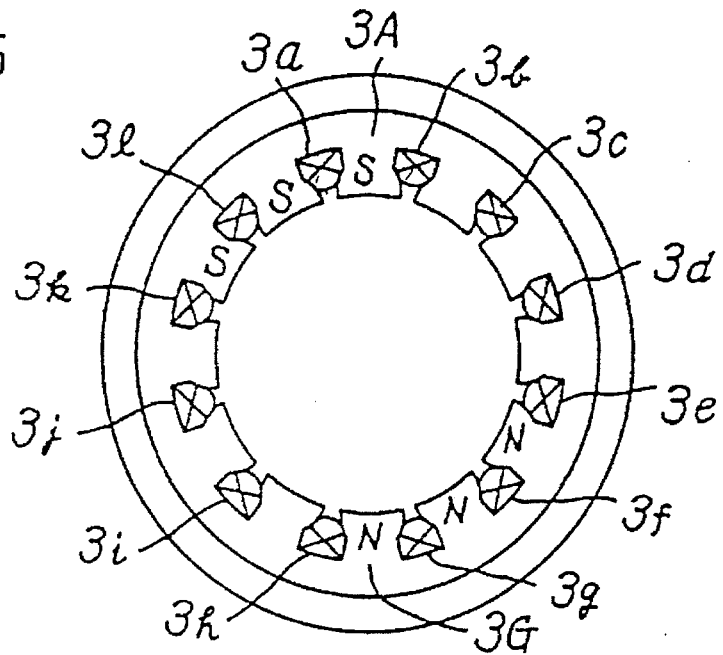
FIG. 5 is a diagram (3) illustrating magnetization of armature coils.
Figure 6:
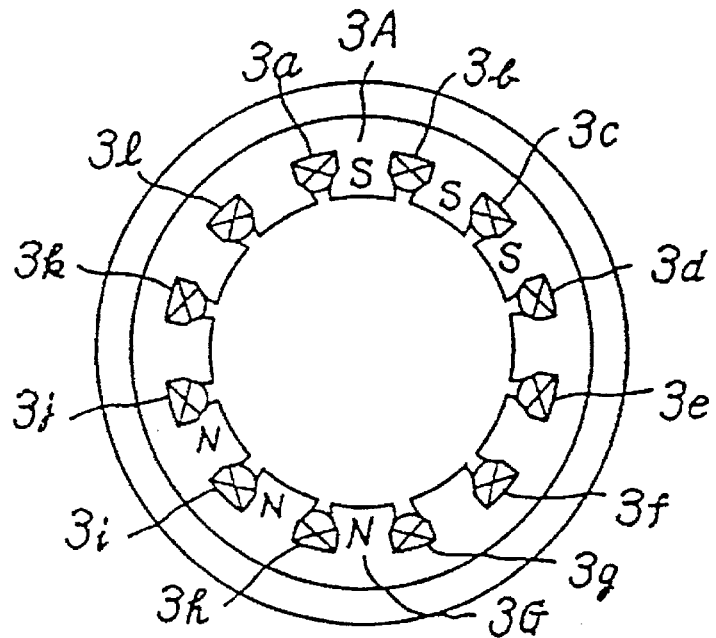
FIG. 6 is a diagram (4) illustrating magnetization of armature coils.

According to such a current supply control circuit for a reluctance motor, magnetization of N- and S-poles due to current supply to respective armature coils is repeated in the order of FIG. 3→FIG. 4→FIG. 5→FIG. 6→FIG. 7→FIG. 8. Thus, the magnetic poles 3A and 3G are not simultaneously magnetized in such a manner that they have the different polalities.

Although the above-described embodiment was explained about the case where a magnetic pole of a fixed armature is wound together by armature coils of plural phases, the present invention can be applied to the case where one magnetic pole is independently wound by only one phase armature coil to realize a rotational magnetization of N- and S-poles. With this modification, the magnitude of magnetization change of the electromagnetic steel plates constituting the armature coils and the rotor due to switching of current supply can be reduced. Thus, iron loss can be reduced and efficiency is increased.

Direction of the flow of the current supplied to the armature coils from one direction to the other direction can be changed between any two phases.

Figure 18:
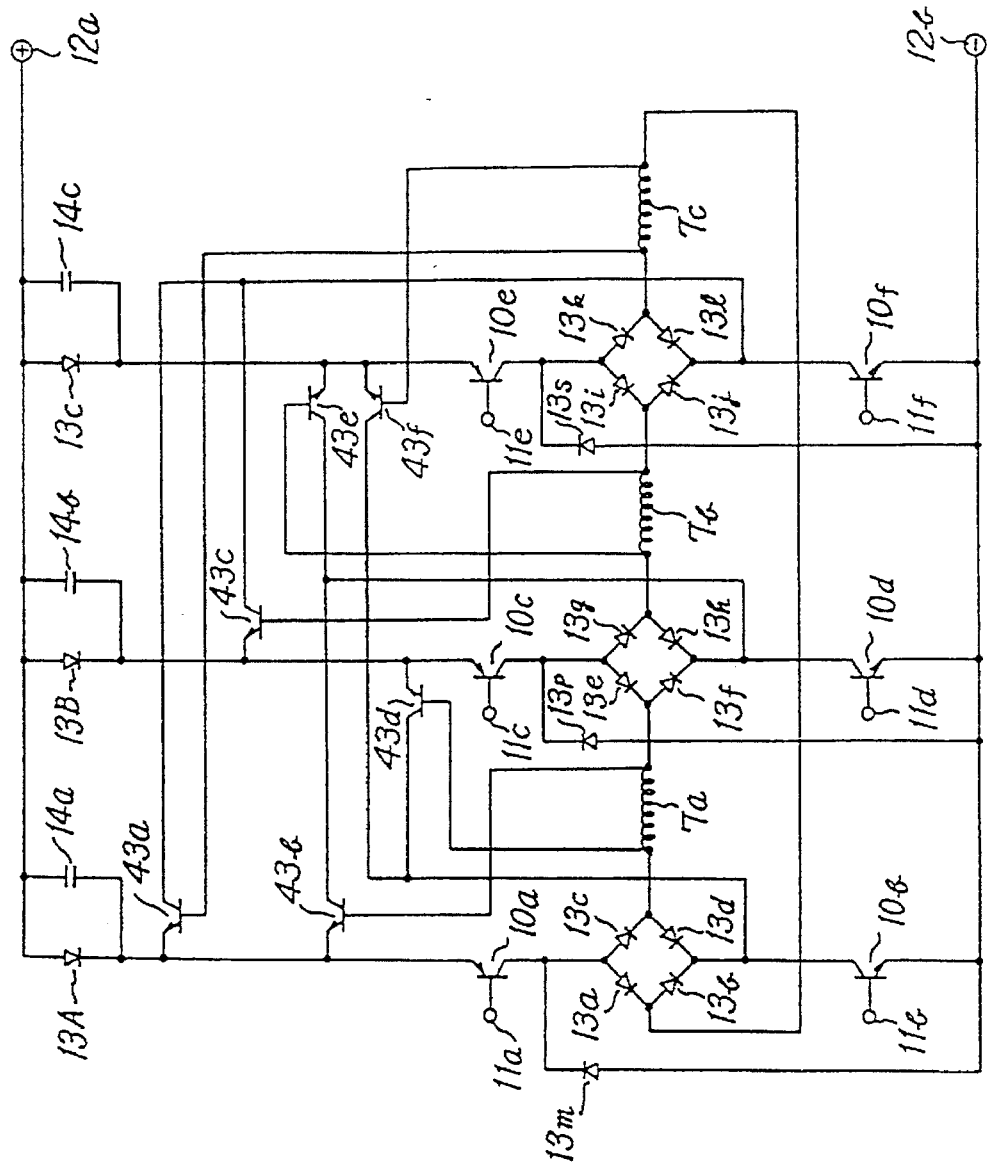
FIG. 18 is a diagram showing a current supply control circuit for another embodiment of the present invention.

FIG. 18 shows another embodiment of the current supply control circuit applied to the reluctance motor of FIGS. 1 and 2 in accordance with the present invention.

In this current supply control circuit of a reluctance motor as shown in FIG. 18, which has a construction similar to that shown in FIG. 9, a connecting point of the first negative side switching element 10*b* and the forward connected diodes 13*b*, 13*d* is connected to terminals of the second and third positive side switching elements 10*c*, 10*e*, which face the positive terminal of the power source, via switching elements 43*d*, 43*f* connected in the opposite direction, respectively. A base terminal of the switching element 43*d* is connected to the connecting point of the diodes 13*c*, 13*d* and the first-phase armature coil 7*a*, while a base terminal of the switching element 43*f* is connected to the connecting point of the diodes 13*a*, 13*b* and the third-phase armature coil 7*c*.

A connecting point of the second negative side switching element 10*d* and the forward connected diodes 13*f*, 13*h* is connected to terminals of the first and third positive side switching elements 10*a*, 10*e*, which face the positive terminal of the power source, via switching elements 43*b*, 43*e* connected in the opposite direction, respectively. A base terminal of the switching element 43*b* is connected to the connecting point of the diodes 13*e*, 13*f* and the first-phase armature coil 7*a*, while a base terminal of the switching element 43*e* is connected to the connecting point of the diodes 13*g*, 13*h* and the second-phase armature coil 7*b*.

A connecting point of the third negative side switching element 10*f* and the forward-directional diodes 13*j*, 13*l* is connected to terminals of the first and second positive side switching elements 10*a*, 10*c*, which face the positive terminal of the power source, via switching elements 43*a*, 43*c* connected in the opposite direction, respectively. A base terminal of the switching element 43*a* is connected to the connecting point of the diodes 13*h*, 13*l* and the third-phase armature coil 7*c*, while a base terminal of the switching element 43*c* is connected to the connecting point of the diodes 13*i*, 13*j* and the second-phase armature coil 7*b*.

A means for controlling input signals to the switching elements of the current supply control circuit for a reluctance motor shown in FIG. 18 and its current supply function will not be explained here because they are substantially the same as those of FIG. 9.

I claim:

1. A current supply control circuit for controlling power from a D.C. power source to a reluctance motor having n-phase armature coils, where n is a positive integer not less than 3, comprising:

a first phase armature coil having a first end, an n-th phase armature coil having a first end, a first positive side switching element having a first end connected to a positive terminal of the direct current electric power source and a second end connected to the first end of the first phase armature coil and to a second end of the n-th phase armature coil via diodes connected in a forward direction respectively, an (n–p+1)-th positive side switching element having a first end connected to the positive terminal of said direct current electric power source and a second end connected to a second end of the (n–p)-th phase armature coil and to the first of the (n–p+1)-th phase armature coil via diodes connected in a forward direction respectively, where p is a positive integer less than n, a first negative side switching element having a first end connected to a negative terminal of said direct current electric power source and a second end connected to the first end of said first phase armature coil and to the second end of said n-th phase armature coil via diodes connected in a forward direction respectively, and, an (n–p+1)-th negative side switching element having a first end connected to a negative terminal of said direct current electric power source and a second end connected to the second end of said (n–p)-th phase armature coil and to the first end of said (n–p+1)-th phase armature coil via diodes connected in a forward direction respectively.

\* \* \* \* \*

UNITED STATES PATENT AND TRADEMARK OFFICE
CERTIFICATE OF CORRECTION

PATENT NO. : 5,652,492
DATED : July 29, 1997
INVENTOR(S) : Itsuki BAHN

It is certified that error appears in the above-indentified patent and that said Letters Patent is hereby corrected as shown below:

TITLE PAGE [22] PCT Filed

"[22] PCT Filed: Nov. 3, 1993" should be --[22] PCT Filed: Nov. 5, 1993--.

Signed and Sealed this

Fourteenth Day of October, 1997

*Attest:*

*Attesting Officer*

BRUCE LEHMAN

*Commissioner of Patents and Trademarks*